United States Statutory Invention Registration [19]

[11] Reg. Number: H980

Harrison

[43] Published: Nov. 5, 1991

[54] TWO-STAGE, SINGLE-UNIT, AND ENERGY-EFFICIENT GRANULATOR DRYER

[75] Inventor: Cecil P. Harrison, Florence, Ala.

[73] Assignee: Tennessee Valley Authority, Muscle Shoals, Ala.

[21] Appl. No.: 350,274

[22] Filed: May 11, 1989

[51] Int. Cl.[5] ..... B22F 3/00; B29C 67/24; A01N 25/00; B01J 8/08

[52] U.S. Cl. ..... 425/222; 425/200; 264/117; 264/118; 264/123; 264/125; 264/126; 264/121; 71/64.03; 71/64.05; 71/44; 422/209; 422/213

[58] Field of Search ..... 425/222, 200, DIG. 20, 425/DIG. 101; 264/117, 118, 123, 125, 126, 121; 71/64.03, 64.05, 44; 422/209, 213

[56] References Cited

U.S. PATENT DOCUMENTS

| | | | |
|---|---|---|---|
| 2,047,393 | 7/1936 | Siems | 71/64.05 |
| 2,741,545 | 4/1956 | Nielsson | 71/43 |
| 4,113,413 | 9/1978 | Pietrusza et al. | 425/222 |
| 4,349,366 | 9/1982 | Saeman | 264/117 |
| 4,373,893 | 2/1983 | Barber | 264/117 |
| 4,478,170 | 10/1984 | Bridges et al. | 425/222 |
| 4,589,904 | 5/1986 | Harrison et al. | 71/46.05 |
| 4,650,682 | 3/1987 | Shirley, Jr. | 426/626 |

FOREIGN PATENT DOCUMENTS

| | | | |
|---|---|---|---|
| 1169723 | 7/1985 | U.S.S.R. | 425/222 |
| 1196639 | 12/1985 | U.S.S.R. | 425/222 |
| 1386278 | 4/1988 | U.S.S.R. | 425/222 |

*Primary Examiner*—Robert L. Stoll
*Assistant Examiner*—C. Harris
*Attorney, Agent, or Firm*—Robert A. Petrusek

[57] ABSTRACT

The present invention relates to methods and implementation, including apparatus comprising a two-stage, single-unit, and energy-efficient rotary drum-type granulator-dryer device having a granulator section and a separate dryer section in a new and novel combination designed for continuously granulating and/or ammoniating, and subsequently drying, respectively, a variety of materials together with specific processes for effecting such granulating and/or ammoniating, and subsequent drying.

8 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TWO-STAGE, SINGLE-UNIT, AND ENERGY-EFFICIENT GRANULATOR DRYER

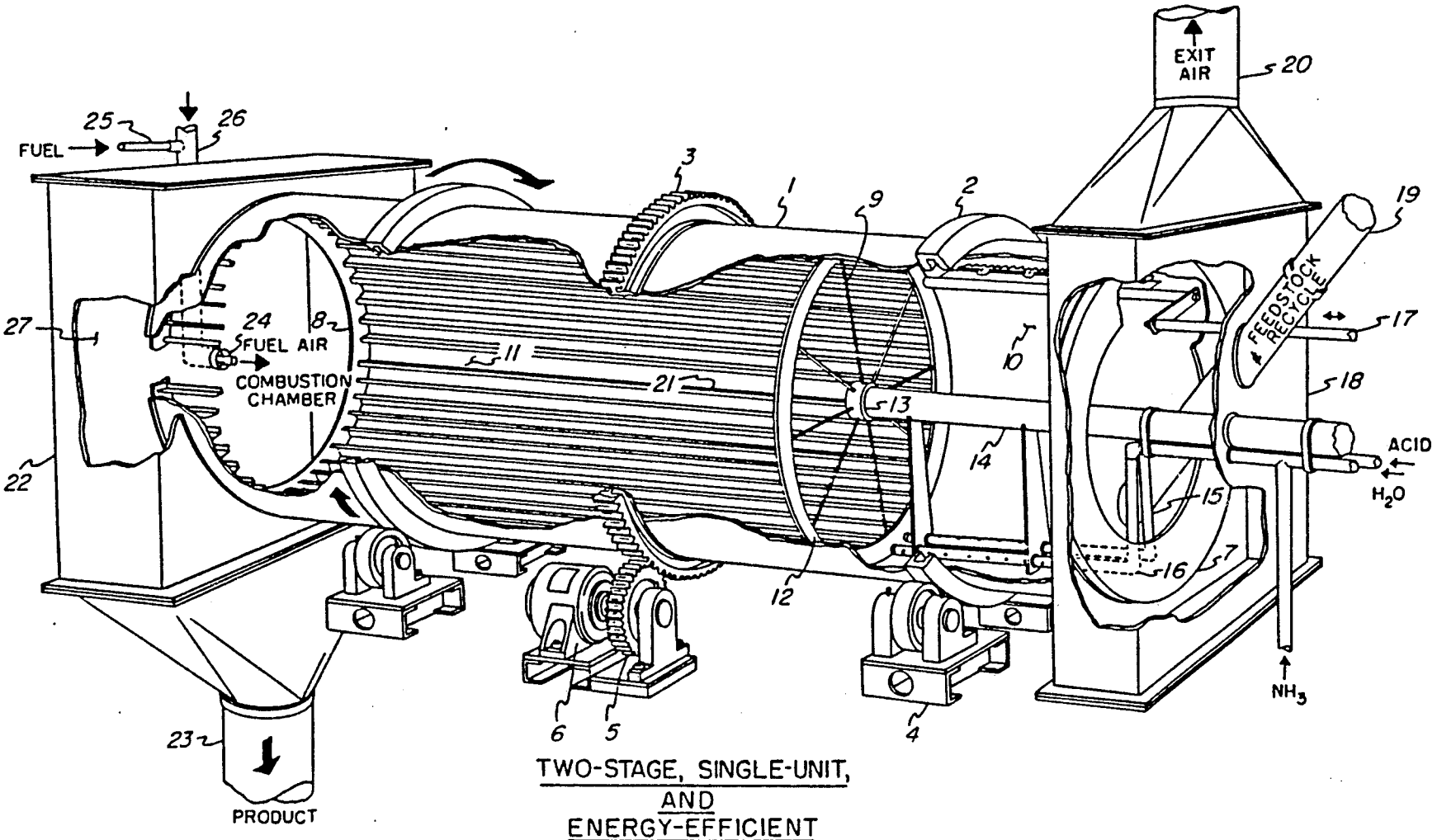
TWO-STAGE, SINGLE-UNIT, AND ENERGY-EFFICIENT GRANULATOR DRYER

TWO-STAGE, SINGLE-UNIT, AND ENERGY-EFFICIENT GRANULATOR DRYER

The invention herein described may be manufactured and used by or for the Government for governmental purposes without the payment to me of any royalty therefor.

INTRODUCTION

One embodiment of the present invention herein described relates to a two-stage, single-unit, and energy-efficient rotary drum-type granulator dryer eminently suitable for the continuous granulation and/or ammoniating and the subsequent drying of fertilizer or for granulating and drying nonfertilizer materials. The novel combination of a granulator and a dryer of the present invention represents an energy-efficient device in which the residual heat which is first applied to the second stage dryer section thereof flows countercurrent to the flow of solids in the instant combination unit and thereby effectively and efficiently acts to promote granulation in the first stage and drying in the second stage. More particularly, a principal object of the present invention is to provide the basic design transformation information which has now been found to be necessary for the construction or manufacture of this new two-stage, single-unit, and energy-efficient granulating-drying type equipment or for modifying or retrofitting existing rotary-type melt-granulation devices, including those of a class known to those skilled in this art as spherodizers as well as those of the classes commonly referred to as either falling-curtain granulators or non-melt-type granulator dryers.

BACKGROUND OF THE INVENTION

1. Field of the Invention

Single-stage, single-unit, rotary drum-granulator devices and their use in and for a variety of production operations are not new per se. They are used commercially, for example, in the production of granular phosphate and complete N-P-K fertilizers. In these devices, feedstocks such as acidified phosphate rock slurry, or phosphoric acid, ammonia and/or steam or water are injected onto or into a tumbling rolling bed of particulate material maintained in the granulator to effect agglomeration of the feed materials within such drum, with said bed of materials generally comprising fertilizer dust, fines, and/or onsize product granules. It has long been known that efficiently and effectively causing the granulation or agglomeration of such particulate material in such drum requires a relatively high degree of moisture for granule formation and that a significant portion of such moisture, which is required for effecting such particle formation, must subsequently be removed so as to enhance the mechanical stability, storage, and handling characteristics of the resulting agglomerate formed therein. For instance, in the commercial production of superphosphate fertilizer, the high-moisture, triple superphosphate (TSP) slurry is introduced into the granulator device which contains a tumbling, rolling, free flowing bed of materials comprising dust, fines, crushed oversize, undersize, and onsize product and therein agglomeration of the resulting maintained and newly introduced dry solids materials and high-moisture slurry occurs. However, in order to attain the desired, necessary, and satisfactory mechanical stability of the resulting formed particles, it is essential that a large portion of the water, originally introduced as a significant constituent of such slurry, be removed.

In the commercial practice of granulation processes such as, for example, the production of granular TSP, in which there is little or no in situ heat generated in the granulator by the combining of feedstock materials therein, it is often beneficial to supply supplemental heat to the granulator unit directly as stem or indirectly by preheating the feedstock materials fed thereto. It will also be appreciated that materials which are granulated in such units usually are discharged therefrom and thereafter introduced into another stand alone unit, such as a rotary dryer, wherein heat energy is added to effect additional drying of the resulting granular product.

2. Description of the Prior Art

It is generally conceded that the most commonly used device for granulating fertilizer is the rotary-drum ammoniator-granulator as described in U.S. Pat. No. 2,741,545, Nielsson, Apr. 10, 1956, assigned to the assignee of the present invention. This single-unit apparatus is usually equipped with an ammonia sparger and a solution sparger. The ammonia sparger is generally located so as to be down in and near the center of the granulation bed during actual operation of such apparatus. Likewise, the solution sparger may also be located down in the granulation bed or it may be located above the granulation bed. Feedstock to the granulator unit may consist only of TSP slurry as in the production of granular TSP; as acid solution or as partially ammoniated acid solution and ammonia as in production of monoammonium or diammonium phosphates; or as solid material such as ammonium sulfate crystals, acid solution, and ammonia as described in the process disclosed in U.S. Pat. No. 4,589,904, Harrison, et al., May 20, 1986, assigned to the assignee of the present invention, for granulating by-product ammonium sulfate crystals. The solution feed as acid, partially ammoniated acid, ammonia solution, or slurry to the granulation unit usually contains a relatively high content of water which is necessary to promote granulation of the dry solids materials; however, the major portion of the introduced water and water that may be formed by chemical reaction in the granulator must be removed from the agglomerates or particles formed in order to obtain mechanical stability and to assure satisfactory handling and storage properties of the resulting granules. The feedstock entering the granulator usually contains at least about 3 percent and oftentimes 10 percent or more by weight free moisture. It is therefore necessary to provide for the additional drying of most of such granular products, since without such additional drying, most of same have been found to not be completely free flowing and to exhibit undesirable tendencies to cake during even short periods of storage.

Currently, large tonnages of granular TSP are produced by first acidulating phosphate rock with phosphoric acid and thereafter granulating the resulting superphosphate slurry in a granulation device of a basic design similar to that described in '545, supra. In such processing operations, fine ground phosphate rock is acidulated with phosphoric acid of about 37 percent to 42 percent $P_2O_5$ concentration. In the acidulation step, the proportions of acid to rock are adjusted or predetermined to provide for a weight ratio of acid $P_2O_5$ to $P_2O_5$ of about 2.3:1 to about 2.5:1. After about 90 minutes of acidulation, the resulting slurry, at a temperature of about 190° F. to 200° F. and containing about 15 percent to 20 percent water, is sprayed onto a bed of recycle and product-size granules maintained in the granulator. While in the ensuing free flowing condition, i.e., rolling and tumbling, in the rotating granulator device, moisture transfer from the slurry to the dry recycle material together with moisture loss by evaporation helps to cause the introduced slurry and dry recycle material to form granules. The granules formed usually contain about 3 percent by weight of moisture as discharged from the granulator device; consequently, additional drying is required to obtain a product with satisfactory handling and storage properties. Accordingly, the product discharged from the lower end of the granulator is subsequently introduced into a separate single-unit dryer which is equipped with a combustion chamber located at the solids feed end of such unit. As the granular product passes through the dryer unit, hot gases are caused to flow cocurrent with respect to the flow of such granular material through the dryer unit to thereby cause the moisture content of such granular product, when subsequently cooled, to be reduced to an acceptable level. The hot gases, still containing a significant quantity of drying potential energy, flow from the dryer unit to the gas-scrubbing system for venting, wherefrom such valuable potential energy values still present or contained therein are lost.

In still another granulating type device as, for example, that described in U.S. Pat. No. 4,650,682, Shirley, Mar. 17, 1987, therein is utilized a rotary drum containing both a first flighted compartment and a second nonflighted compartment which combination of compartments is designed for sequentially chemically treating particulate solid materials, in free-flowing condition, with fluid reactants; i.e., first with acid and subsequently with ammonia. A primary object of such treatment is to therein convert a product, such as poultry litter, into a feed supplement deemed suitable for ruminants.

It should be readily apparent to those skilled in this art that both the sequence of flow of materials through the two compartments of Shirley, '682 supra, as well as their physical arrangement is substantially different from that of the instant invention. In the instant invention, the first compartment of the two-compartment, single-unit, and energy-efficient granulator dryer is nonflighted and is the compartment wherein granulation of the input feed materials occurs. The second compartment of the instant two-compartment, single-unit, and energy-efficient granulator dryer is flighted and is where drying occurs. Granulation or agglomeration of feedstock fed to the granulation compartment is promoted by transfer of moisture from the feed materials or water formed by chemical reaction to the hot gases first entering and then exiting the dryer compartment of the instant two-stage, single-unit, and energy-efficient granulator dryer and then passing through the granulator compartment of the instant, new, novel, two-stage unit. It should also be appreciated by those skilled in this art that in the operation of the two-stage or two-component single-unit combination granulator-dryer device of the present invention, all chemical reactions occur in the granulator compartment and, for all practical purposes, no sequential chemical reactions occur thereafter, albeit, at least some of those reactions initiated in the first-stage or compartment may continue to completion therein. Accordingly, the first compartment-acidifier and second compartment-ammoniator described in '682, supra, simply would not be suitable for either granulating or for agglomerating and drying of fertilizer or nonfertilizer feedstock without the attendant utilization of another separate or combined dryer unit because, without such additional and separate drying equipment, there are no provisions for the necessary removal of water from the resulting product.

There are, of course, many other types of granulation equipment that are well known in and utilized by the chemical processing industry such as, for example, the pug mill, the blunger, and the pan granulator. It is also well known and appreciated that these devices are of the single-unit operation type and in the operation of most processes in which such equipment is utilized, other than certain melt granulation processes, a separate dryer unit is required in combination therewith, for final water removal from the resulting granular product.

SUMMARY OF THE INVENTION

The present invention provides for the design and operation of a new and novel, two-stage, generally two-compartment, single-unit, rotary-type, granulator-dryer device which more efficiently and effectively utilizes the input energy required when effecting a granulation process in which drying of the granulator product is required than do methods, processes, apparatuses, or systems which have heretofore been used or taught in the prior art. The first compartment of the instant device is free of lifting flights, whereas the second compartment thereof is provided with such lifting flights. In addition, said first compartment is provided with injection or spargings means, which sparging means generally comprise a plurality of reactant spray nozzle means in and spaced apart along the length of said first compartment, although, in some case specific applications, a single nozzle means may be sufficient to provide and effect the required application or introduction of reactant material into the bed of material maintained in a free-flowing condition within said first compartment. As in the teachings of '545, supra, such sparger means is normally located juxtaposed the inner wall of the drum in a manner such that portion of the moving bed which travels in the direction of rotation of the drum is in the target area of such sparging means. The second compartment of the instant device is provided with lifting flights which lifting flights generally, but not necessarily, extend along most of the length of said second compartment. Said second compartment is normally free of injection or sparging means since the primary purpose of this second section of the instant two-stage device is to effect efficient and effective drying of the granules produced in said first section and subsequently introduced into said second section. The present invention also substantially reduces the capital cost requirement of either a suitably retrofitted granulation unit or a new granulation facility and also reduces the operating cost of such granulation plant in that it eliminates one major processing unit, i.e., a separate, stand-alone dryer. In addition, the apparatus of the instant invention, when in operation, substantially reduces the required total energy input thereto.

It has been found and discovered that the objectives of the present invention may be attained in a device of the class described herein, which in one embodiment thereof comprises in combination an inclined-rotary cylindrical device consisting of a granulation compartment and a drying compartment; three retaining rings, two of which are singly disposed at each of the ends of the drum, and the third of which is disposed at the junction of the granulator and the dryer sections; a support member generally consisting of a rigid beam extending the full length of the granulator section; a spider wheel and sealed bearing for supporting said rigid support beam; a first liquid sparging means and a second liquid sparging means both having lengths which are usually almost equal to that of the granulation section disposed within the device near the inner wall and substantially parallel to the axis thereof and about 20 to 50 degrees, and more preferably about 30 to 45 degrees from a vertical diameter in the direction of rotation of the device; and means for passing a current of air through said device. Said first liquid sparging means and said second liquid sparging means normally comprise an ammonia-distributing sparger and a solutions-distributing sparger, with said solutions sparger oftentimes further being used as an acid sparger.

OBJECTS OF THE INVENTION

It is therefore a principle object of the present invention to provide apparatus, as well as methods for the operation thereof, whereby various fertilizer feedstock, or other chemical processing feedstock materials can be satisfactorily and economically granulated and/or ammoniated and subsequently dried in a two-stage, single-unit, and energy-efficient rotary drum.

A further object of the present invention is to provide methods and means for obtaining maximum utilization of the input energy applied to a granulation or pelletizing process.

Still another objective of the instant invention is to provide the basic design transformation information necessary for modifying and retrofitting existing granulation equipment in a manner to effect operating within the dictates of the invention parameters of the instant teachings, which existing equipment was originally designed for other specific applications or for melt-type granulation.

Still further and more general objects and advantages of the present invention will appear from the more detailed description set forth below, it being understood, however, that this more detailed description is given by way of illustration and explanation only, and not necessarily by way of limitation since various changes therein may be made by those skilled in the art without departing from the true spirit and scope of the present invention.

DESCRIPTION OF THE DRAWINGS

The present invention will be better understood from a consideration of the following description taken in connection with the accompanying drawing in which:

The single FIGURE is a partially cut-away perspective view depicting components of a preferred device which may be operated according to principles of the instant invention, it is being understood, of course that specific and particular components and/or assemblies thereof may be further modified or replaced or substituted for by similar pieces of equipment or equivalents thereof.

Referring now more specifically to the single FIGURE, it may be seen that a specially designed rotary drum, or, as also referred to infra, a two-stage, single-unit, and energy-efficient granulator dryer rotary drum is generally designated at 1, with drum 1 having open ends and fitted with tires 2 and spur gears 3. In this particular embodiment, drum 1 is mounted on trunnions 4 and driven through gear 5 by motor 6, although other types of drive means or arrangements may be employed. The as-shown retainer ring 7 is located at the feed end of two-stage, single-unit, and energy-efficient granulator dryer 1 and retainer ring 8 is located at the discharge end of two-stage, single-unit, and energy-efficient granulator dryer 1.

Spider wheel 9 is disposed at a point delineating the end of granulation section 10 and the beginning of dryer section 11 of drum 1. Spider wheel 9 is equipped with retaining ring 12 and sealed bearing 13 for supporting rigid support member 14.

Acid feedstock nonacid-solution feedstock from a source not shown is fed to granulation section 10 of drum 1 via sparger 15 mounted within drum 1. Ammonia as liquid anhydrous, gaseous, or as ammonia-containing fluid, or any other gaseous and/or fluid feedstock from a source not shown is fed to granulator or granulation section 10 of drum 1 via injection means generally shown as sparger 16. Granulator scraper 17 may be of a reciprocating type or may be of the fixed type and may or may not be required.

Although sparger or injection means of various designs may be utilized in the practice of the instant invention, as shown, sparger 15 is a pipe preferably constructed from a corrosion resistant material such as Hastelloy (Type B). Sparger 15 is closed at the downstream end and contains ports which may be evenly spaced beginning near the feed end of granulator section 10 and continuing for approximately three-fourths the length of granulation section 10. Ammonia sparger 16 is preferably constructed of Type 316 stainless steel. Sparger 16 is a closed-end pipe with ports or apertures which may be evenly spaced beginning about one foot downstream from the uppermost acid port of sparger 15 and continuing downstream to approximately one foot beyond the furthermost acid port of sparger 15. Both spargers 15 and 16 are disposed near the lower inner wall of drum 1 well beneath the surface of the bed of material (not shown) maintained in drum 1 and at a location usually from about 30 to about 45 degrees from a vertical diameter in the direction of rotation of drum 1 and generally parallel to its axis. For purposes of a clear illustration of the instant invention, and as noted supra, the bed of material is not shown. Sparger 15 is positioned so that its spray apertures or ports face toward the center axis of drum 1 and therefore in a direction about perpendicular to the movement of the particulate solids therein maintained in a bed of materials, which bed is in a generally free flowing condition by virtue of the rotation of drum 1. Sparger 16 is positioned so that its ports face in a direction which is rotated approximately 90 degrees from the "pointing" direction of sparger 15 and in a direction which effects the "pointing" thereof in a mode of discharge which is substantially countercurrent to the movement of said particulate solid material comprising said bed.

It should be understood that in carrying out a granulation process such as the granulation of TSP slurry, sparger 15 would be positioned above the granulation bed so that the slurry is sparged onto the granulation bed. Sparger 16 may be removed or may remain under the granulation bed for steam addition when granulating such TSP.

Hood 18 is disposed about the feed end of drum 1 and is equipped with chute 19 for introducing solids feedstock and recycle material from feeders not shown. The upper portion of hood 18 communicates with duct 20 and with induced-blower and gas-scrubbing means not shown.

Dryer section 11 of drum 1 is equipped with lifting flights 21. Combination hook-combustion chamber 22 is disposed about the discharge end of rotary drum 1 and is adapted to conduct granulated material discharged from dryer 11 to chute 23 which conveys the resulting dried product to a cooler unit not shown. Combination hood 22 is equipped with burner 24 and with a fuel source not shown, which fuel source communicates with burner 24 by means of line 25. Also not shown is a compressed air supply which likewise communicates with burner 24, but by means of line 26. Excess ambient air enters combination hood-combustion chamber 22 via adjustable ports 27.

In operation, solid materials consisting of solid feedstock material, recycled product fines, dust, and/or some crushed product material are fed at a constant rate by a feeder-conveyor system not shown into chute 19 and thence into drum 1. Reactants, such as acid and ammonia are introduced from sources, not shown, at the inlet of the lines feeding spargers 15 and 16, respectively. A bed of granulating material, also not shown, having a depth equal to about one-fourth to perhaps two-fifths of the diameter of drum 1 is maintained within drum 1 by retaining ring 12 at the discharge end of granulation section 10. Material is kept from spilling out of the feed end of drum 1 by retaining ring 7. Rotation of drum 1 causes the bed of granulating material therein to assume a configuration that causes the surface of the bed to slope at an angle of between about 30 and about 45 degrees to the horizontal. The steepness of the inclination of the bed depends, of course, upon the speed of rotation and the diameter of drum 1. Preferably, the speed of rotation is in the range of 30 to 45 percent of the critical speed for the particular material and drum combination. Under such conditions there is a relatively thick layer of material in granulation section 10 moving upward at a speed approximating the peripheral speed of drum 1, and a relatively thin layer of material at or near the surface of the bed moving downward at a substantially greater speed. This action, together with wetting and/or chemical reactions in granulator section 10 of drum 1, causes agglomeration of solids and/or reactants. As initially formed, the agglomerates are loosely bound and are soft due to their relatively high moisture content. Residual heat from dryer section 11 of drum 1, together with the relatively high velocity of airflow through drum 1, accelerates water removal from the granules or agglomerates formed therein which, consequently, accelerates transformation of such soft granules into hard and storage-stable granules. Utilizing the residual heat from dryer section 11 of drum 1 reduces the energy required to produce granulated particles with acceptable free moisture levels.

DESCRIPTION OF THE PREFERRED EMBODIMENTS

The popular current practice used in most processes for granulation of nonmelt-type fertilizers is to continuously feed feedstock and recycle material, together one or more separate streams of liquid reactants, to a rotary-drum granulator wherein the dry solids material and the solution-phase materials and/or gaseous materials interact mechanically and/or react chemically to promote granulation of the feed components. The granulator is a rotary drum-type vessel with length usually 1.5 to 2.0 times its diameter. In practice, air at a velocity of 2 to 3 feet/second and at a rate of about 500 cubic feet/minute/ton of solids material in the granulator is caused the flow countercurrent through the granulator to remove water vapor and/or other volatiles. The granules or agglomerates discharging from the granulator usually contain a free moisture content ranging upwards to about 5 percent by weight thereby causing the product to be mechanically unstable, sticky, and unsuitable for handling and storage.

Final removal of moisture from the granulator product is accomplished by removing such product from the granulator and passing such granulator product into a separate second rotary-type drum device which is equipped with lifting flights and at the same time passing hot air and combustion products cocurrent, in regard to passage of said solids, through the dryer unit.

A conventional rotary dryer is usually designed so as to maintain a product residence time of 15 to 30 minutes in the unit, and its length is usually 3 to 6 times its diameter. In operation, airflow at a velocity of up to about 7 feet/second and at a rate of about 1,000 cubic feet/minute/ton of granular material is caused to flow through the unit. In most operating granulation plants today, airflow through the dryer unit is cocurrent in regard to flow of solids material through the dryer unit. Cocurrent hot airflow, as is commonly practiced, is of necessity for many currently practiced granulation processes, namely in the production of diammonium phosphate because to do the opposite, i.e., to use countercurrent air flow would result in contacting the high pH granules near the discharge end of the dryer with the maximum temperature air thereby causing unacceptable loss of ammonia from the granular diammonium phosphate product. With cocurrent airflow operation, the air and gases exit the dryer unit at the solids discharge end and are exhausted via the dust collectors and scrubber systems. The temperature of the gases exiting the dryer may range from about 150° F. to 250° F., consequently, the remaining or residual drying capacity of the hot air is lost. A primary object of the instant invention is to maximize the efficiency of the process input energy and to provide basic design transformation information for modifying existing rotary-type melt-granulation devices to nonmelt-type granulator-dryer devices.

By combining the granulator and dryer into a two-stage, single-combination, granulator-dryer unit and by redirecting the airflow to be countercurrent to the flow of solids through the combination granulator-dryer unit, as detailed in the FIGURE, maximum efficiency of such input energy is realized.

EXAMPLES

In order that those skilled in the art may better understand how the present invention can be practiced, the following examples are given by way of illustration and not necessarily by way of limitation. These examples illustrate how the present invention improves the energy efficiency of a granulation process in which countercurrent hot gas flow through the dryer is permissible and also how a single-unit apparatus such as a spherodizer can be modified to handle granulation processes other than melt-type granulation processes. The tests described, and the data therefrom which is given herein as examples were designed to compare the effectiveness and efficiency of the instant, novel combination granulation-dryer apparatus and technique with the technique of a conventional separate single-unit granulator separate single-unit dryer and attendant technique.

EXAMPLE I

Bench-scale, continuous operation tests have shown that the instant, new, and novel apparatus was suitable for carrying out the process for granulating by-product ammonium sulfate as is described in '904, supra, and also for granulating TSP slurry. In the granulation of by-product crystalline ammonium sulfate, it is desirable to effect drying of the granulated crystalline material by using countercurrent airflow through the dryer unit instead of the more conventional cocurrent airflow because contacting the wet granules with hot air causes sudden flashing of moisture which in turn disrupts the bonding mechanism of the granules with resultant decreases in mechanical stability of the granulated particles; consequently, the granules produced are soft and an excessive quantity of dust is generated during processing and handling. The granulation tests, shown below, were carried out continuously in a one-foot diameter by three-foot long bench-scale, two-stage, single-unit, and energy-efficient granulator dryer that was constructed according to the principles shown in the attached FIGURE. The granulator section was 10 inches in length and was equipped with an acid sparger and an ammonia sparger. Both spargers, when used for granulating ammonium sulfate, were located near the shell of the granulator-dryer unit and when in operation, both spargers were submerged down into the granulation bed. The remainder of the drum, about 26 inches, was equipped with lifting flights and served as the dryer section. The unit was equipped with retaining rings that were 2.75-inches high at the feed end of the granulator, 2.5-inches high at the point separating the granulator section and the dryer section, and 2-inches high at the discharge end of the dryer section. The unit was inclined downward from the feed end of the granulator section to the discharge end of the dryer section at an angle of about 1.5 degrees from the horizontal. For purposes of convenience and to facilitate operation of these tests, the ends of the drum were not hooded. By-product ammonium sulfate crystals, as feedstock, were fed to the unit together with recycle material consisting of fines, crushed oversize, and some product-size granules from previous operations. Acid (92% $H_2SO_4$) and acid dilution solution (15% ammonium sulfate, 2% alum, and 83% water) were fed to one sparger and gaseous anhydrous ammonia was fed to the other sparger. The drum was rotated at 25 revolutions/minute. A flame from a propane burner was directed into the discharge end of the dryer section of the drum, and an induced blower was used to cause a stream of air to flow countercurrent to the flow of solids in the unit. The propane was fed to the burner from a small (30-pound) container that was positioned on an electronic balance, and the quantity used was continuously measured by weighing.

Evaluation of the instant invention was carried out by granulating by-product ammonium sulfate with use of the bench-scale equipment, supra, according to the process described in '904 supra. For comparison, bench-scale tests for granulating by-product ammonium sulfate were also carried out using a separate conventional single-unit granulator and a separate single-unit dryer.

In granulation of by-product crystalline ammonium sulfate, very satisfactory products containing about 20 weight percent nitrogen, 24 percent sulfur, and 0.2 percent moisture were obtained. It is noted that all percents are given in this and following examples on a weight percent basis unless otherwise indicated. These products resulted from materials which were granulated continuously with use of a bench-scale model of the new and novel two-stage, single-unit, and energy-efficient granulator dryer constructed as described in the FIGURE, supra. Based on calculations of the test data, the input drying energy required was about two times less/pound of product than that required when using a conventional separate single-unit granulator and a separate single-unit dryer. The production data for these tests are given in Table I, infra. The duration of tests of the novel apparatus was 5 hours and they were operated at a production rate of 9.8 pounds/hour from a feed comprising 75 percent commercial standard-size (run-of-pile) by-product ammonium sulfate and 25 percent ammonium sulfate made from sulfuric acid and gaseous anhydrous ammonia. About 96 percent of the by-product feedstock, supra, was fed to the process as dry feedstock and the remainder, about 4 percent, was dissolved in the water of dilution into which had already been added alum, said water of dilution to be later admixed with sulfuric acid utilized in the process to make said fraction of feed, produced by reacting said sulfuric acid and gaseous ammonia to produce ammonium sulfate solution, supra, and introduced to the process therein incorporated. As noted supra, the acid solution contained a small quantity of alum, equivalent to about 0.04 percent aluminum in the final product, as granulation aid. The dry by-product ammonium sulfate feedstock was fed to the recycle transport system by means of a screw-type metering feeder. Mixing of by-product and ammonium sulfate recycle materials occurs during transport to the granulator section. As noted, supra, the single-unit, bench-scale, granulator-dryer device was a rotary-drum device 1 foot in diameter by 3-feet long and was inclined with a slope of about 0.5 inches/foot from the feed end of the granulator section to the discharge end of the dryer section. The device was fitted with a 2.75-inch high retainer ring at the junction separating the granulator and dryer sections, and a 2-inch high retainer ring at the discharge end of the dryer section. The granulator was equipped with an acid sparger and an ammonia sparger that were 5/16-inch closed-end stainless steel tubes each containing four evenly-spaced 1/16-inch openings. The acid sparger was equipped with a tee located at a point outside of, but close to, the granulator through which acid dilution solution (ammonium sulfate, water, and alum) was added. The spargers were positioned beneath the surface of the rolling granulation bed and near the bed center with respect to its depth. The ammonia sparger was positioned in a manner so that its openings were directed upstream into the movement of solids. The acid sparger was positioned in a manner so that its openings faced toward the center axis of the novel device which was about 90 degrees from the ammonia sparger openings. Metering pumps were used to meter 92 percent sulfuric acid and acid dilution (ammonium sulfate, water, and alum) solution to the acid sparger; ammonia was metered to the ammonia sparger by means of a rotameter. Residence time of the material maintenance in the granulator section was about 5 minutes.

As was also noted, supra, the dryer section of the single-unit granulator-dryer apparatus was 26-inches long and was equipped with eight evenly spaced 1.5-inch high lifting flights. Propane was used as the heat source for drying. The burner tip was directed into the discharge end of the dryer section and controlled so that the dryer product temperature was 290° F. Airflow through the single-unit granulator-dryer apparatus was metered at a rate for 640 cubic feet/minute at 1 atmosphere and 70° F. Exit air temperature ranged from about 150° F. to 200° F. Residence time in the dryer section was about 11 minutes.

Granulated and dried product discharged from the single-unit granulator-fryer onto a belt conveyor and was transported to a double-deck vibrating screen with about one square foot of active area. Screen (Tyler mesh) sizes were 5 mesh (top) and 10 mesh (bottom). A cooler is not used in the bench-scale operation because heat loss during handling is adequate. A Waring® blender was used to crush oversize material. The crushed material and fines, together with some onsize material, were returned to the single-unit granulator-dryer device as recycle. NOTE: Any references made herein to materials and/or apparatus which are identified by means of trademarks, trade names, etc., are included solely for the convenience of the reader and are not intended as or to be construed an endorsement of said materials and/or apparatus.

In the startup operation the bench-scale equipment, described above, was loaded with recycle material from a previous operation and was put into operation. Then, introduction of feedstock (ammonium sulfate-acid solution, ammonia, and by-product crystals) was initiated. To evaluate the effectiveness of residual heat from the dryer section for evaporating water, the acid-dilution media (ammonium sulfate, water, and alum solution) feed rate was not varied but was fed at a constant rate and the strong (92% $H_2SO_4$) acid feed was adjusted downward to a level so as to maintain good granulation at the granulator section of the single-unit granulator-dryer device. The duration of a test was usually 5 to 6 hours. The fuel efficiency of the new single-unit granulator-dryer device for evaporating water was calculated from data obtained in tests with the instant invention and with data obtained with tests using conventional bench-scale equipment consisting of a separate single-unit granulator and a separate single-unit dryer of the same throughput capacity.

Granulation and drying during the bench-scale plant run was very satisfactory; onsize (minus 5 plus 9 mesh) product was 74 percent, and 99 percent of the product was in the range of minus 6 plus 16 mesh, Tyler screen size. Granule (minus 7 plus 8 mesh size) crushing strength was 3.5 pounds; the recycle-to-product ratio was 6.5:1, and moisture content of the product was 0.2 percent by both the Karl Fischer and AOAC-130° C. methods.

Chemical analysis of the product (as weight percent) was 20.3 percent nitrogen, 72.6 percent $SO_4$, and 0.04 percent aluminum; the $NH_3$:$SO_4$ mole ratio was 1.92; product pH was 2.08. The product has good appearance and has exhibited excellent handling and storage properties when subjected to standardized physical properties tests.

These tests demonstrated that the by-product ammonium sulfate granulation process as described in '904, supra, can be successfully carried out with use of the instant, novel, two-stage, single-unit, and energy-efficient granulator dryer. In the by-product ammonium sulfate granulation process, the reaction of feedstock (sulfuric acid and ammonia) at the granulator section is highly exothermic and, as a result of the residual heat from the dryer section of the instant, novel, two-stage, single-unit, and energy-efficient granulator dryer, it was necessary to use additional water, amounting to about 52 percent of normal, for the conventional single-unit granulator/single-unit dryer, to maintain an adequate degree of wetness in the granulator section to cause granulation. The results of these tests clearly demonstrate that the instant, new, and novel two-stage, single-unit, and energy-efficient granulator dryer of the instant invention is significantly superior in utilization of energy for removing water to cause drying in the production of granular fertilizer or in production or granular or nongranular nonfertilizer materials.

TABLE I

Granulation of By-Product Ammonium Sulfate

| | Tests with indicated equipment | | |
|---|---|---|---|
| Equipment used in tests | Novel granulator-dryer unit | | Conventional single-unit granulator, single-unit dryer |
| Test No. | 118 | 122 | 71 |
| Operating time, hours | 5.0 | 5.0 | 3.0 |
| SUMMARY OF TESTS | | | |
| By-product[a] in product, wt % | 75 | 75 | 75 |
| Production rate, lb/h | 9.8 | 9.8 | 21.8 |
| Product grade | 20-0-0-24S | | |
| GRANULATOR CONDITIONS | | | |
| Drum rotation, r/min | 25 | 24 | 40 |
| Airflow (1 afm and 70° F.), $ft^3$/min | 640 | 640 | 0 |
| Feed rates, g/min | | | |
| A/S crystals | | | |
| Fed dry | 51 | 51 | 116 |
| Dissolved in water-alum solution | 5 | 5 | — |
| Water-A/S-alum solution | 30 | 30 | 30 |
| Sulfuric acid (92% $H_2SO_4$) | 15 | 15 | 40 |
| Ammonia (gaseous anhydrous) | 4 | 4 | 7 |
| Recycle | 484 | 410 | 600 |
| Temperature, °F. | 170 | 170 | 200 |
| Recycle ratio, lb/lb product | 6.5 | 5.5 | 3.6 |
| Granulator product temp, °F. | 155 | 155 | 160 |
| Moisture content, wt % | | | |
| Karl Fischer method | 3.3 | 2.2 | — |
| AOAC at 130° C. | 3.3 | 2.3 | 0.8 |
| Granule (−7 +8 Tyler mesh) crushing | 1.0 | 1.0 | 1.1 |

TABLE I-continued

| Granulation of By-Product Ammonium Sulfate | | | |
|---|---|---|---|
| | Tests with indicated equipment | | |
| Equipment used in tests | Novel granulator-dryer unit | | Conventional single-unit granulator, single-unit dryer |
| Test No. | 118 | 122 | 71 |
| Operating time, hours | 5.0 | 5.0 | 3.0 |
| strength, lb | | | |
| DRYER CONDITIONS | | | |
| Drum rotation, r/min | 25 | 25 | 10 |
| Airflow (1 afm and 70° F.) $ft^3$/min | 640 | 640 | 280 |
| Dryer product temp, °F. | 290 | 290 | 290 |
| Screen analysis (Tyler mesh, wt %) | | | |
| +5 | 7.0 | 5.8 | 7.0 |
| −5 +10 | 66.9 | 52.8 | 71.7 |
| −10 | 26.1 | 41.4 | 21.3 |
| Moisture content, wt % | | | |
| Karl Fischer | 0.2 | <0.1 | — |
| AOAC at 130° C. | 0.2 | 0.1 | <0.1 |
| Granule (−7 +8 Tyler mesh) crushing strength, lb | 3.5 | 3.1 | 3.0 |
| ONSIZE PRODUCT | | | |
| Screen Analysis, (Tyler mesh, wt %) | | | |
| +5 | 0.3 | 0.2 | 0 |
| −5 +6 | 26.0 | 9.6 | 14.1 |
| −6 +8 | 51.9 | 29.9 | 53.7 |
| −8 +10 | 17.1 | 49.5 | 21.7 |
| −10 +12 | 2.8 | 7.4 | 6.6 |
| −12 +16 | 1.1 | 2.9 | 3.4 |
| −16 | 0.8 | 0.5 | 0.5 |
| Chemical analysis, wt % | | | |
| Total N | 20.3 | 20.4 | 19.7 |
| $SO_4$ | 72.6 | 72.0 | 70.7 |
| Al | 0.04 | 0.05 | 0.03 |
| Moisture | | | |
| Karl Fischer | 0.2 | <0.1 | — |
| AOAC at 130° C. | 0.2 | 0.1 | <0.1 |
| pH (10% solution by wt) | 2.08 | 2.06 | 1.89 |
| $NH_3$:$SO_4$ mole ratio | 1.92 | 1.94 | 1.97 |
| Granule (−7 +8 Tyler mesh) crushing strength, lb | 3.2 | 3.3 | 3.0 |

[a]Standard-size by-product ammonium sulfate crystals from a caprolactam operation.

EXAMPLE II

The results of tests comprising this example are offered and intended to illustrate how granulation of TSP slurry can be carried out in a more energy-efficient manner by utilizing the instant, new, novel, two-stage, single-unit, granulator dryer than is now commonly practiced with use of a separate single-unit granulator and a separate single-unit dryer. In one series of these tests, the airflow through the novel single-unit granulator-dryer device was countercurrent to flow of solids through the unit, and in another series of these tests, airflow through the novel single-unit granulator-dryer device was cocurrent in regard to flow of solids material. For comparison, another series of tests conducted with the use of a single-unit granulator and a single-unit dryer that was operated with cocurrent air-flow in regard to flow of solids is offered. Airflow through the single-unit granulation device and through the single-unit dryer was metered by means of a rotameter for proportions to be equivalent to about 7,000 cubic feet/ton of TSP.

In the granulation of TSP, the chemical reaction of phosphoric acid and phosphate rock is essentially completed before the slurry resulting from the combination thereof enters the granulator, consequently, granulation of the slurry is essentially a result of (1) blending the resulting high-moisture slurry with dry recycle material, and (2) subsequent water removal therefrom.

In the tests described in this example, the equipment that was utilized to evaluate the instant, new, and novel two-stage, single-unit, and energy-efficient granulator dryer was the same as that described in Example I, supra, except that only one sparger, located in the granulator section of such new and novel equipment, was utilized. This single sparger was positioned above the granulation bed so that the liquid-phase slurry was sparged onto the granulation bed and not down into the granulation bed.

For the comparison tests with a conventional single-unit granulator and a single-unit dryer, the granulator was a 12-inch diameter rotary drum that was 12 inches in length, and the single-unit dryer was also a rotary drum that was 12 inches in diameter by 36-inches long and equipped with lifting flights. In operation, slurry was sparged onto the granulation bed which bed was maintained in the granulator in the same manner as in tests of the new two-stage, single-unit, and energy-efficient granulator dryer comprising the instant invention. The single-unit was operated so that the airflow through the unit was cocurrent to movement of solids materials.

The TSP slurry used in these granulation tests was prepared batch-wise by acidulating 37.7 pounds of fine-ground Florida phosphate rock (32.5% total $P_2O_5$, 47.8% CaO) with 51.9 pounds of wet-process phosphoric acid (51.4% $P_2O_5$) that had been diluted with 20.2 pounds of water. The proportions of acid and rock used in preparing the slurry were those for a weight ratio of $P_2O_5$ in the acid:$P_2O_5$ in the rock to equal to 2.3.

The rock extraction vessel was 14 inches in diameter by 28-inches high and was equipped with six evenly-spaced baffles that extended 1.5 inches from the inner vessel wall. A 1.25-inch drain was located at the bottom of the vessel wall. The outer wall of the vessel was equipped with nine 110-volt rheostat-controlled strip heaters and insulated with about 2 inches of magnesia. Heat was applied to the bottom of the vessel was by means of an 18-by 24-inch 220-volt temperature-controlled hot plate. Agitation was provided by means of a mixer which was equipped with three sets of two ¾-inch wide blades that were sloped at about 45 degrees from the horizontal so that movement of material was downward; distance from blade tip to blade tip was 6 inches. The blade sets were at 2-inch spacings on the shaft and positioned in planes so as to be 120 degrees apart. The bottom set of blades was near the bottom of the shaft. A ½-horsepower, direct-current, variable-speed motor was used to drive the mixer. The reaction vessel and auxiliary equipment was mounted on a platform-type balance.

In preparing the TSP slurry for a granulation test, the acid was added to the reactor and then heat was applied to increase the acid temperature to 150° F. prior to the addition of rock. When the rock addition was completed, the temperature of the slurry was adjusted to 200° F. and extraction was continued for 45 minutes. During the phosphate-rock extraction period and during granulation of the TSP slurry, makeup water, equivalent to evaporation loss, was continuously fed to the extraction vessel. The slurry was metered to the granulation device at a constant rate for 7 pounds/hour of dry product by means of a metering pump.

In startup of the granulation operation, the system was loaded with recycle material from a previous operation, and this recycle was circulated through the system while heat was applied to increase the temperature of such recycle material to normal operating temperature, i.e., about 170° F. When normal operating temperature was reached, the flow of TSP slurry at a constant rate for production of 7 pounds product/hour to the granulator device was started. The duration of a rest was usually 4 hours of continuous operation. During each test, pertinent data and samples were collected for analytical and physical evaluation. Typical operating data and the chemical and physical properties of materials used or produced as well as the measure of drying energy used are illustrated in Table II, infra.

The data presented in Table II, infra, show that the instant, new and novel two-stage, single-unit, and energy-efficient granulator dryer is more efficient for granulating TSP than is the currently-used separate conventional single-unit granulator and the separate single-unit dryer.

In tests 12 and 13 of this example, the single-unit granulator-dryer device was provided with a countercurrent airflow, the propane fuel supply was introduced at a rate of about 4.3 grams/minute, and the recycle-to-product weight ratio was about 29:1 when the slurry feed contained about 49.5 percent water. Granular material exited the granulator section of the single-unit granulator at a temperature of about 145° F. and contained 2.7 percent moisture. After the granular material has passed through the dryer section, the temperature of the resulting dried product was about 200° F., and moisture content of the dried product was 2.1 percent. The temperature of drying air exiting the single-unit granulator dryer was about 175° F. Granule (−7 +8 mesh, Tyler screen size) crushing strength was 9.7 pounds. Chemical analyses of the resulting cooled product (about 72° F.) showed that 39.4 percent of the total $P_2O_5$ was soluble and that 3.9 percent was citrate-insoluble.

In tests 14 and 15 of the single-unit granulator device, the airflow was cocurrent with regard to flow of solids. Moisture content of the feed slurry was about 35 percent by weight, and the propane fuel supply was at a rate of about 4.7 grams/minute. In these tests, the product-to-recycle weight ratio for good granulation was about 17:1. Material was discharged from the granulator section at a room temperature of 190° F., and the resulting granular product contained about 3.5 percent moisture. After the granular material had passed through the dryer section, it was observed that the temperature and the moisture content thereof was about 220° F., and about 2.4 percent by weight, respectively. The temperature of air exiting the dryer section of the unit was about 200° F. as compared to about 175° F. when the unit was operated with countercurrent airflow. Crushing strength of −7 +8 size product granules was about 9 pounds. Chemical analyses of the product show that 40 percent of the total $P_2O_5$ was water-soluble and that citrate-insoluble $P_2O_5$ was 3.6 percent by weight.

In comparison (Table II, tests 10 and 11), the data resulting therefrom show that use of a separate conventional granulator unit and a separate conventional dryer unit that utilized cocurrent airflow was less efficient for granulating TSP than was the instant, new, and novel two-stage, single-unit, and energy-efficient granulator dryer. In these tests (tests 10 and 11), the feed slurry contained 6.5 percent less (about 43.1 versus 49.5 percent) water than did the slurry fed to the two-stage, single-unit granulator dryer, supra; however, the propane feed requirement for drying was about 6 grams/minute, which was about 40 percent higher than the 4.3-gram/minute fuel consumption when using countercurrent airflow and the two-stage, single-unit granulator dryer, supra. In the tests, a recycle-to-product weight ratio of about 29:1 was required for good granulation operation when the moisture content of the feed slurry was about 43 percent. The temperature of the granulator product was about 130° F., and moisture content was about 2 percent. After the granulator product had passed through the single-unit dryer, the temperature of the resulting dryer product was about 200° F., and moisture content was 2 percent by weight. Drying air exited the single-unit dryer at a temperature of 225° F. Chemical analyses of the resulting cooled product showed that 39.4 percent of the total $P_2O_5$ was water-soluble and that about 4.5 percent was citrate-insoluble.

Based on reported results of these tests, it should be evident to all skilled in the art that the instant, new, and novel two-stage, single-unit, and energy efficient granulator dryer, and the technique for its utilization, is an energy-efficient design which readily lends itself to granulating either fertilizer or nonfertilizer materials, and is of particular importance and applicability in those instances and applications in which essentially no chemical reaction or reactions occur inside the granulator.

TABLE II

| | Granulation of Triple Superphosphate | | | | | |
|---|---|---|---|---|---|---|
| | Tests with single-unit granulator dryer | | | | Tests with conventional single granulator, single dryer | |
| Test No. | 12 | 13 | 14 | 15 | 10 | 11 |
| Time, hours | 4 | 4 | 3 | 4 | 4 | 4 |
| Airflow through dryer[a] | Countercurrent | | Cocurrent | | Cocurrent | |
| Slurry[b] feed, g/min | 78.8 | 77.6 | 80.0 | 77.7 | 78.4 | 78.1 |
| Recycle:product wt ratio | 28:1 | 30:1 | 16:1 | 18:1 | 27:1 | 30:1 |
| Temp of granulator product, °F. | 145 | —[c] | 190 | 190 | 132 | 130 |
| Temp of dryer product, °F. | 195 | 205 | 210 | 207 | 196 | 200 |
| Temp of exit drying air, °F. | 180 | 170 | 217 | 220 | 225 | 225 |
| Fuel[d] feed, g/min | 4.4 | 4.2 | 4.7 | 4.6 | 6.1 | 5.8 |
| Water content of products, wt % | | | | | | |
| TSP slurry | 50.7 | 48.3 | 35.5 | 35.0 | 43.7 | 42.5 |
| Granulator | 2.7 | 2.7 | 3.1 | 4.0 | 1.9 | 2.0 |
| Dryer | 2.1 | 2.1 | 2.6 | 2.2 | 1.1 | 1.4 |
| Chemical analysis, wt % | | | | | | |
| Citrate-insoluble $P_2O_5$ | 3.9 | 3.8 | 3.6 | 3.5 | 4.8 | 4.1 |
| Water-soluble $P_2O_5$ | 39.2 | 39.6 | 39.7 | 40.3 | 39.4 | 39.3 |
| Friability, crushing strength of −7 +8 Tyler mesh screen size, lb | 9.2 | 9.6 | 10.0 | 7.9 | 11.7 | 11.8 |

[a]Airflow direction in regard to flow of solids.
[b]Average feed rate during test for 7 pounds of dry product.
[c]Not determined because of thermocouple problem.
[d]Propane gas.

INVENTION PARAMETERS

After sifting and winnowing through the data herein presented, as well as other results and operations of my new, novel, and improved procedure for granulating and drying of either fertilizer or nonfertilizer materials eminently suitable for subsequent use in bulk-blend or direct-application operations, the modifications of existing equipment such as spherodizers or curtain granulators or for manufacture of new and improved energy-efficient granulation-drying equipment are summarized below.

| Variables | Limits | Preferred |
|---|---|---|
| Drum size and configuration | | |
| Diameter:length | 1:10 | 1:6 |
| Length of granulator section to dryer section | 1:1 | 1:3 |
| Drum rotation Percent of critical speed | 10–60 | 30–50 |
| Airflow through drum | | |
| $ft^3$/ton of product | 300–1,500 | 500–1,000 |
| Velocity, ft/second | 1–10 | 3–8 |
| Product temperature, °F. | 200–325 | 275–300 |

While I have shown and described particular embodiments of my invention, modifications and variations thereof will occur to those skilled in the art. I wish it to be understood therefore that the appended claims are intended to cover such modifications and variations which are within the true scope and invention of my invention.

What I claim as new and desire to secure by Letters of Patent of the United States is:

1. Apparatus for treating particulate solid material in free-flowing condition with at least two fluid reactants comprising: a rotating drum with its axis slightly inclined from the horizontal and adapted for rotation about said axis; said drum having a cylindrical side wall, including an inner peripheral surface, the lowermost portion of which comprises the bottommost position on said inner peripheral surface of said drum; and, said drum having a first longitudinal portion of its length free of lifting flights wherein is formed particulate material into a tumbling bed; said drum also having a second longitudinal portion of its length fitted with internal lifting flights extending about the whole of the length of said second drum portion for lifting and dropping particulate material in the form of free falling curtains, which curtains extend about the whole of the length of said second drum portion; a first plurality of reactant spray nozzle means in and spaced apart along the length of said first drum portion and about parallel to the axis thereof, and located near the inner peripheral surface of said drums so as to be continuously embedded in said tumbling bed for delivery of a first fluid reactant into said tumbling bed, and a second plurality of reactant spray nozzle means in and spaced apart along the length of said first drum portion and about parallel to the axis thereof, and located near the inner peripheral surface of said drum so as to be continuously embedded in said tumbling bed for delivery of a second fluid reactant into said tumbling bed; said first plurality of reactant spray nozzle means and said second plurality of reactant spray nozzle means located in a lower quadrant of said drum, when viewed in a plane perpendicular to the axis of said drum, into which a point located at the bottommost position on said inner peripheral surface of said drum would next enter; air heating and drying means for supplying heated and dried air to said second drum portion, and air moving means for providing distribution of heated and dried air removed from said air heating and drying means and introduced into intimate contact with said curtains of particulate material in said second portion of said drum prior to contact of said air with said particulate material in said tumbling bed in said first portion of said drum.

2. The apparatus of claim 1 wherein said first plurality of reactant spray nozzle means have outlets facing about opposite to the direction of rotation of said drum, and said second plurality of reactant spray nozzle means have outlets facing about in the direction of the axis of said drum.

3. Apparatus for simultaneously acidifying and ammoniating particulate solid material and sequentially drying the resulting acidified and ammoniated particulate material in free-flowing condition comprising: a rotating drum with its axis slightly inclined from the horizontal and adapted for rotation about said axis; said drum having a cylindrical side wall, including an inner peripheral surface, the lowermost portion of which comprises the bottommost position on said inner peripheral surface of said drum; and said drum having an upstream end and a downstream end and having at said upstream end a first longitudinal portion of its length free of lifting flights wherein is formed particulate material into a tumbling bed; said drum having at its downstream end a second longitudinal portion for receiving particulate material from the first drum portion with the length of the second drum portion fitted with internal lifting flights extending about the whole of the length of said second drum portion for lifting and dropping particulate material and for forming such material into free falling curtains, which curtains extend about the whole of the length of said second drum portion; a plurality of ammonia spray nozzle means in and spaced apart along the length of said first drum portion and about parallel to the axis thereof and located near the inner peripheral surface of said drum so as to be continuously embedded in said tumbling bed for delivery of ammonia into said tumbling bed, and a plurality of acid spray nozzle means in and spaced apart along the length of said first drum portion and about parallel to the axis thereof and located near the inner peripheral surface of said drum so as to be continuously embedded in said tumbling bed for delivery of acid into said tumbling bed, said plurality of ammonia spray nozzle means and said plurality of acid spray nozzle means located in a lower quadrant of said drum, when viewed in a plane perpendicular to the axis of said drum, into which a point located at the bottommost position on said inner peripheral surface of said drum would next enter; air heating and drying means for supplying heated and dried air to said second drum portion; and air moving means for providing distribution of heated and dried air removed from said air heating and drying means and introduced into intimate contact with said curtains of particulate material in said second portion of said drum prior to contact of said air with said particulate material in said tumbling bed in said first portion of said drum.

4. The apparatus of claim 3 wherein said plurality of ammonia spray nozzle means have outlets facing about opposite to the direction of rotation of said drum, and said plurality of acid spray nozzle means have outlets facing about in the direction of the axis of said drum.

5. The apparatus for treating particulate solid material in free-flowing condition with ammoniating fluid which comprises in combination a rotating drum having open ends, having a length greater than its diameter, disposed with its axis inclined from the horizontal about 3 degrees and adapted for rotation about said axis; said drum having a cylindrical side wall, including an inner peripheral surface, the lowermost portion of which generally comprises the bottom of said drum; said drum also having three retaining rings with two of said retaining rings singly disposed at the ends of said drum and with one of said retaining rings disposed between said drum ends to thereby define a first portion of said drum and a second portion of said drum; a stationary manifold disposed within the first portion of said drum and along the axis thereof; a valved conduit communicating with the interior of said manifold and adapted to introduce ammoniating fluid into said manifold at a controlled rate; a distributing member comprising a pipe of length about equal to the length of the first portion of said drum and disposed within said first portion of said drum about parallel to the axis thereof; said distributing member disposed near the inner peripheral surface of said drum and located in a lower quadrant of said drum, when viewed in a plane perpendicular to the axis of said drum, into which a point located at the bottommost position on said inner peripheral surface of said drum would next enter; said pipe having closed ends and a series of openings along its side and supply tubes disposed to communicate with said manifold and said pipe; said second portion of said drum fitted with internal lifting flights extending about the whole of the length of said second drum portion for lifting and dropping particulate material in the form of free falling curtains, which curtains extend about the whole of the length of said second drum portion; and air moving means, comprising a fan, for passing a current of drying air through said drum from said second portion to said first portion.

6. The apparatus of claim 5 wherein said series of openings in said pipe face in a direction which is about opposite to the direction of rotation of the drum.

7. Apparatus for treating particulate solid material in free-flowing condition comprising: a rotating drum with its axis slightly inclined from the horizontal and adapted about said axis; said drum having a cylindrical side wall, including an inner peripheral surface, the lowermost portion of which generally comprises the bottommost position on said inner peripheral surface of said drum; and, said drum having a first longitudinal portion of its length free of lifting flights wherein is formed particulate material into a tumbling bed; said drum also having a second longitudinal portion of its length fitted with internal lifting flights extending essentially the whole of the length of the second drum portion for lifting and dropping particulate material in the form of free falling curtains, which curtains extend about the whole of the length of said second drum portion; a plurality of spray nozzle means in an spaced apart along the length of said first drum portion, about parallel to the axis thereof, and located away from the inner peripheral surface of said drum so as not to be continuously embedded in said tumbling bed and thereby disposed for delivery of a fluid reactant onto said tumbling bed; said plurality of spray nozzle means located in a lower quadrant of said drum, when viewed in a plane perpendicular to the axis of said drum, into which a point located at the bottommost position on said inner peripheral surface of said drum would next enter; air heating and drying means for supplying heated and dried air to said second drum portion; and air moving means for providing distribution of heated and dried air removed from said air heating and drying means and introduced into intimate contact with said curtains of particulate material in said second portion of said drum prior to contact of said air with said particulate material in said tumbling bed in said first portion of said drum.

8. The apparatus of claim 7 wherein said plurality of reactant spray nozzle means have outlets facing in a direction which is about opposite to the direction of rotation of said drum, and adapted to introduce a liquid-phase feedstock onto the surface of the tumbling bed of particulate material.

* * * * *